T. L. MOUNT.
SYSTEM FOR CHARGING CAR LIGHTING BATTERIES.
APPLICATION FILED JUNE 23, 1917.

1,275,586.

Patented Aug. 13, 1918.
2 SHEETS—SHEET 1.

Thomas L. Mount, Inventor
By his Attorneys
Pennie, Davis, Marvin & Edmonds

T. L. MOUNT.
SYSTEM FOR CHARGING CAR LIGHTING BATTERIES.
APPLICATION FILED JUNE 23, 1917.

1,275,586.

Patented Aug. 13, 1918.
2 SHEETS—SHEET 2.

Thomas L. Mount, Inventor
By his Attorneys
Pennie, Davis, Marvin & Edmonds

UNITED STATES PATENT OFFICE.

THOMAS L. MOUNT, OF NEW YORK, N. Y.

SYSTEM FOR CHARGING CAR-LIGHTING BATTERIES.

1,275,586. Specification of Letters Patent. Patented Aug. 13, 1918.

Application filed June 23, 1917. Serial No. 176,464.

*To all whom it may concern:*

Be it known that I, THOMAS L. MOUNT, a citizen of the United States, residing at New York city, borough of Manhattan, in the county of New York, State of New York, have invented certain new and useful Improvements in Systems for Charging Car-Lighting Batteries; and I do hereby declare the following to be a full, clear, and exact description of the invention, such as will enable others skilled in the art to which it appertains to make and use the same.

The present invention relates to car lighting systems in which a storage battery is normally charged from a generator driven from the axle when the car is in motion. In addition to the regular charging circuits, systems of this type are usually provided with an extra circuit connecting the battery to terminals which may be connected to an outside source in order that the battery may if necessary be charged while the car is standing in the yards. It frequently happens when batteries are supplied with current from yard service mains that they are overcharged because through carelessness or lack of judgment they are left on charge for too long a period of time.

The present invention seeks to remedy this defect of axle car lighting systems by providing means that shall automatically disconnect the battery from the charging mains when it becomes fully charged. In order to reduce the number of additional elements to a minimum the invention provides that the same means that controls the battery charging current to reduce or discontinue it when the battery has been fully charged by the generator shall also be used to control the charging current if the battery is being charged from an outside source.

Figure 1:
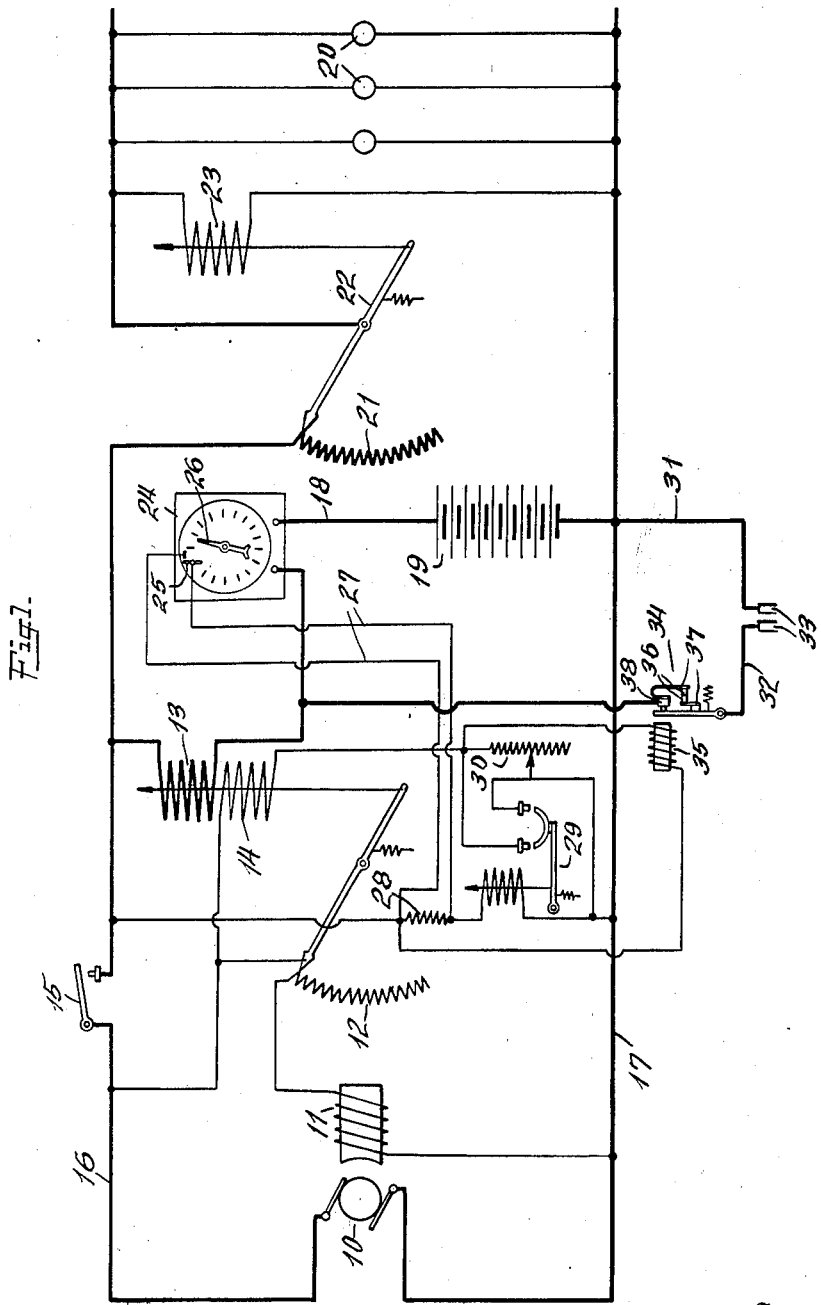
Figure 2:
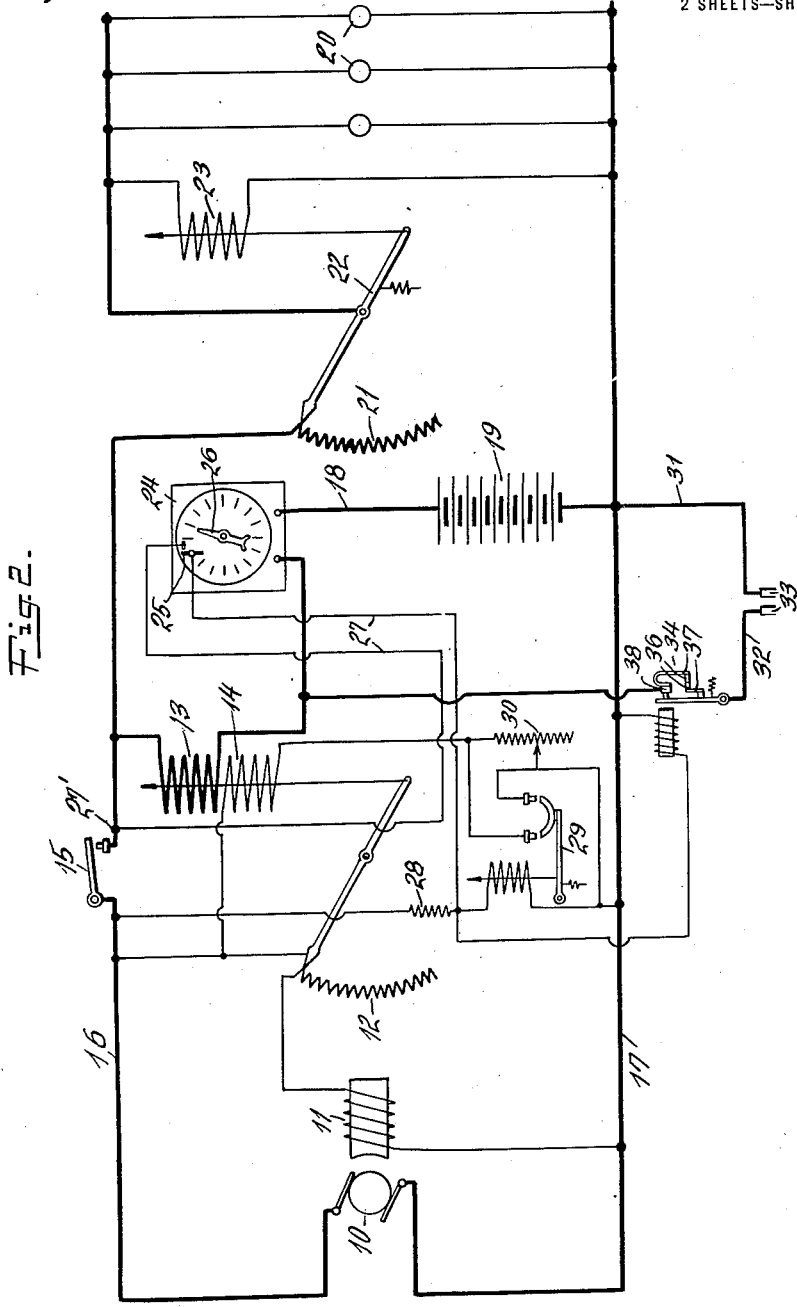

Other objects and advantages of the invention will appear from a detailed description of two embodiments thereof as illustrated in simplified form in Figures 1 and 2 of the accompanying drawings.

Referring to the drawings in which similar reference characters denote similar parts in each figure 10 represents the armature of a generator adapted to be driven from a car axle and having a shunt field 11 connected through the resistance 12 of a generator regulator (shown diagrammatically) comprising a series winding 13 and a shunt winding 14 acting upon a plunger which controls the amount of resistance in circuit with the field 11. The usual automatic switch common to all axle driven lighting systems is indicated at 15 in one of the two main conductors 16—17 leading from the generator.

In the systems here shown the series coil 13 of the generator regulator is connected in a branch 18 leading from main conductor 16 to one terminal of a storage battery 19, the other terminal of which is connected to main conductor 17. It will be understood, however, that the invention may be applied to systems in which the series coil 13 is used in any other relationship. Main conductor 16 extends to the lamps 20 and may have inserted in it more or less of the resistance 21 of a lamp regulator 22, the actuating coil 23 of which is in parallel with the lamps.

In the battery branch 18 is inserted a device for measuring the charge supplied to the battery. In the present case this device is shown as an ampere hour meter 24 which may be so constructed as to run somewhat slower when the battery is charging than when discharging to compensate for the inefficiency of the battery. Associated with the meter is a switch 25 actuated by the pointer 26 when it reaches a position corresponding to the total number of ampere hours that should be supplied to the battery to bring it to fully charged condition.

In the system illustrated in Fig. 1 the contacts of switch 25 are connected by leads 27 to opposite ends of a resistance 28, in circuit with which between the two main conductors on the battery side of the automatic switch 15, is a relay 29. The armature of this relay when attracted establishes a short circuit about that portion of a variable resistance 30 which is in circuit with the voltage coil 14 of the regulator between the main conductors.

In the system illustrated in Fig. 2 the resistance 28 and relay 29 are connected in series between the main conductors 16—17 on the generator side of the automatic switch 15. One of the leads 27 from the meter switch 25 is connected to main conductor 16 at a point 27' on the battery side of the automatic switch, while the companion lead is connected to the end of the resistance 28 on the side thereof toward main conductor 17.

To provide for charging the battery 19 from an external source conductors 31 and 32 lead from opposite sides of the battery to appropriate circuit terminals or charging receptacles 33. The connections of these two conductors should be such that the ampere hour meter 24 is included in circuit therewith in order that the charge to the battery may be indicated and controlled by the meter when current is being supplied from an outside source. A circuit breaker 34 is inserted in conductor 32. In the system of Fig. 1 the coil 35 of the circuit breaker is connected between main conductors 16—17 through a portion of resistance 30.

In the system of Fig. 2 the coil of the circuit breaker is connected in parallel with the coil of relay 29 between the end of resistance 28 and main conductor 17. The circuit breaker should preferably be of a type having auxiliary non-metallic contacts 36 mounted upon springs 37 in order to give a delayed break and thus prevent arcing and possible injury to the main metallic contacts 38 when the charging circuit is suddenly opened by the action of coil 35.

In the general operation of the systems shown in the two figures, assuming the car to start from rest, the generator gradually increases in speed and when its potential reaches a predetermined value the automatic switch 15 closes and current flows to the battery and any translating devices that may be in use. By virtue of the series coil 13 of the regulator in the battery branch the generator will be so regulated that the charging current will be maintained constant. The resistance 30 in series with the shunt coil 14 is of such magnitude that this coil has little or no effect upon the regulation of the generator which proceeds as a constant current one so far as the battery is concerned until the speed of the car decreases so that the automatic switch opens or until a predetermined charge has been supplied to the battery which in the embodiment here disclosed will be measured in ampere hours by the meter 24. When the hand 26 of the meter reaches a point corresponding to the fully charged condition of the battery as measured in ampere hours switch 25 will be closed to short circiut resistance 28 in series with relay 29.

This action will occur in the system of Fig. 2 as well as in that of Fig. 1, since in the former figure the automatic switch will be closed when the battery is being charged from the generator. When resistance 28 is short circuited relay 29 will be connected directly across the main conductors and will be responsive to the difference in potential between them. Although the cumulative indications of the ampere hour meter may tend to show that the battery is fully charged, the latter on account of internal losses, inefficiency and other causes may in reality be below its fully charged condition as determined by its back voltage. In order to insure that the battery shall continue to receive a charge until its voltage has risen to that corresponding to a fully charged condition, the relay 29 in the embodiment here shown is adjusted to respond only to such a voltage as indicates full charge. If this voltage is not present when the meter switch closes the relay will remain ineffective and the charge to the battery will continue until the pronounced rise of voltage that denotes the fully charged condition of the battery occurs. The relay will then respond to this rise of voltage and short circuit the resistance 30 in series with the shunt coil 14 which will add its effect to that of the series coil and reduce the voltage of the generator relative to the back voltage of the battery to such a value that the battery will float upon the line, but the generator will still carry the lamp load so long as the automobile switch is closed. If the car slows down or stops so that the automatic switch opens, the battery will supply any lamps or other translating devices that may be connected in circuit and the meter hand will travel away from switch 25 allowing the latter to open. Resistance 28 will then be reinserted in series with relay 29 which will be deënergized sufficiently to release its armature and remove the short circuit about resistance 30 so that upon a subsequent closure of the automatic switch 15 the generator will resume its charging function.

If now it be desired to charge the battery while the car is standing in the yards, at which time, of course, the automatic switch will be open, appropriate charging mains are connected to terminals 33. The charging current will flow through the meter and when a number of ampere hours sufficient to bring the battery to its fully charged condition has been supplied the meter hand will close switch 25. Since in the system of Fig. 1, resistance 28 and relay 29 are connected in series upon the battery side of the automatic switch they will be in circuit at all times. When the meter contacts establish a short circuit about resistance 28, relay 29 will be at once energized because the yard charging mains are usually supplied from a source having a constant potential which will be high enough to energize this relay. Operation of relay 29 will short-circuit the portion of resistance 30 which is in series with coil 35 of the circuit breaker and this coil should be so designed that it will then be energized to cause the circuit breaker to be operated. If at the time when the car is being charged in the yards lamps should be turned on current will be taken from the battery and the meter hand will move away from its switch. Resistance 28 will then be reinserted in series with relay 29 so that the latter will release its armature and connect resistance 30 in series with the coil of the circuit breaker, which will then be deënergized to reëstablish the charging circuit, whereby current will be supplied to the battery and translating devices from the yard mains.

In the system of Fig. 2 resistance 28, relay 29 and circuit breaker 35 will not take any current when the automatic switch 15 is open, but when the battery is being charged from yard mains and the meter pointer closes switch 25 a circuit will be established from conductor 32, through coil 13, main conductor 16, upper meter lead 27, switch 25, lower meter lead 27, coil 35, main conductor 17 and conductor 31. The circuit breaker will thus be actuated to break the charging circuit, which will remain open as long as the meter pointer remains in contact with the arm of switch 25. If any current be drawn from the battery the meter contacts will be opened and the circuit breaker deënergized to reëstablish the charging circuit.

In both embodiments of the invention the battery will thus be automatically maintained at its fully charged condition irrespective of any lamps that may be burning while the car is standing still. The charging mains may be left connected to the car indefinitely without danger of any overcharge and yet when the car is put into service the battery will be in a fully charged condition regardless of how much current demand there may have been, which in case of certain classes of service may amount to a considerable number of ampere hours.

At the time of large conventions, such as the national political, Elks, Shriners and others, numbers of Pullman cars are used for transporting the delegates. If the hotel accommodations of the convention city are insufficient many of the cars are occupied during the convention and there is a heavy demand upon the batteries, which will therefore require frequent recharging. By means of the present invention the batteries may be maintained in a fully charged condition with a minimum amount of attention since the apparatus is automatic in its operation. The necessity for constant and careful attention while the car is on charge is eliminated, and even if the car is entirely ignored no disastrous results will follow as in the case of systems at present in use where the battery is left unprotected at such times.

It will be understood that various changes may be made in the details of the invention and modes of applying the same to other systems than the ones specifically shown herein without departing from the principle of the invention.

I claim:

1. In a car lighting system, a generator adapted to be driven from the car axle, a regulator therefor, a storage battery, circuit connections whereby said battery may be charged from said generator when the car is in motion, means associated with said circuit connections whereby the battery may be charged from an external source when the car is not in motion, a circuit breaker associated with said means, means for measuring the charge and discharge of said battery, and means under the control of said measuring means for modifying the action of said regulator when the battery is being charged from the generator and for causing the operation of said circuit breaker when the battery is being charged from an external source.

2. In a car lighting system, a generator adapted to be driven from the car axle, a regulator therefor, a storage battery, circuit connections whereby said battery may be charged from said generator when the car is in motion, means associated with said circuit connections whereby the battery may be charged from an external source when the car is not in motion, a circuit breaker associated with said means, means for measuring the charge and discharge of said battery, and means dependent upon the charge supplied to said battery and the potential thereof for modifying the action of said regulator when the battery is being charged from the generator and for causing the actuation of said circuit breaker when the battery is being charged from an external source.

3. In a train light system, a generator adapted to be driven from the car axle, a storage battery, circuit connections whereby said storage battery may be charged from said generator, means associated with said circuit connections whereby said battery may be charged from an external source when the car is not in motion, a circuit breaker associated with said means, mechanism for regulating the output of the generator, and means dependent upon the charge supplied to said battery adapted to modify the action of said regulating mechanism when the battery is being charged from the generator, and to control said circuit breaker when the battery is being charged from an external source.

4. In a car lighting system, a generator adapted to be driven from the car axle, a storage battery, main conductors between the generator and the battery, an automatic switch for controlling the main conductors, auxiliary conductors associated with the main conductors whereby the battery may be charged from an external source, a circuit breaker associated with the auxiliary conductors and having its coil connected between the main conductors on the generator side of the automatic switch, means for measuring the charge and discharge of the battery, and means controlled by the measuring means for establishing a circuit for the circuit breaker coil when the automatic switch is open and the battery is being charged from an external source.

In testimony whereof I affix my signature.

THOMAS L. MOUNT.